June 30, 1953  H. E. CROWTHER ET AL  2,643,952
METHOD OF PREPARING FISH FILLET BLOCKS
Filed Oct. 5, 1948  2 Sheets-Sheet 1

INVENTORS
LAWRENCE T. HOPKINSON
HAROLD E. CROWTHER
by Wright, Brown, Quimby & Houy
ATTYS June 30, 1953 — H. E. CROWTHER ET AL — 2,643,952

METHOD OF PREPARING FISH FILLET BLOCKS

Filed Oct. 5, 1948 — 2 Sheets-Sheet 2

INVENTORS
LAWRENCE T. HOPKINSON
HAROLD E. CROWTHER
by Wright, Brown, Quinby & May
ATTYS Patented June 30, 1953

2,643,952

UNITED STATES PATENT OFFICE 2,643,952

METHOD OF PREPARING FISH FILLET BLOCKS

Harold E. Crowther, Watertown, and Lawrence T. Hopkinson, Newton, Mass., assignors to The Atlantic Coast Fisheries Company, Boston, Mass., a corporation of Maine Application October 5, 1948, Serial No. 52,862

11 Claims. (Cl. 99—195)

This invention relates to the art of preparing fishery products for market and to the product obtained thereby. Its main object is to produce a frozen block or package of edible fish flesh of regular shape and uniform thickness having the appearance of a skinned fillet of fish. A more particular object is to produce such a block of fish flesh which contains two or more fillets or pieces thereof and in which, while frozen and after being thawed and cooked, the pieces adhere together tightly enough so that the block may be handled as a single piece of fish flesh.

Consumers of frozen fish flesh demand that it have a natural appearance. The so called fish fillet is the product that consumers particularly appreciate. This product is characterized by V-shaped markings or striations similar to multiple chevrons. They are clearly distinguishable as to color, spacing and texture. When absent from a piece of skinned fish flesh, the piece is unattractive to purchasers and not easily salable.

One of the difficulties met with in the marketing of frozen fish fillets in the forms heretofore furnished is the irregular size and shape of the package of fillets. Because of the natural shape of the fish, the fillets cut from them vary greatly both in thickness and in width from the nape end to the tail end. Fish also vary greatly in length, which adds a third variable to the size and shape of fillets. These variations are objectionable to both the producer of fillets and the consumer. To the producer, the variations cause added expense in weighing and packaging, and prohibit the production of uniform attractive packages of the frozen product. To the consumer, such variations make uniform cooking difficult since if the thick parts are fully cooked, the thinner parts may be over done.

By virtue of our invention we have been able to produce frozen fish packages of a prescribed weight, rectangular outline, uniform thickness in all parts, which have the desirable appearance on the surface of fresh skinned fillets of fish, which retain their characteristics of uniformity after thawing and cooking. The invention comprises such a frozen fish product, a method of producing the same, and apparatus for use and assistance in the carrying out of such method.

The essential characteristics of the invention are explained in the following specification in connection with illustrative drawings, in which—

Figure 1:
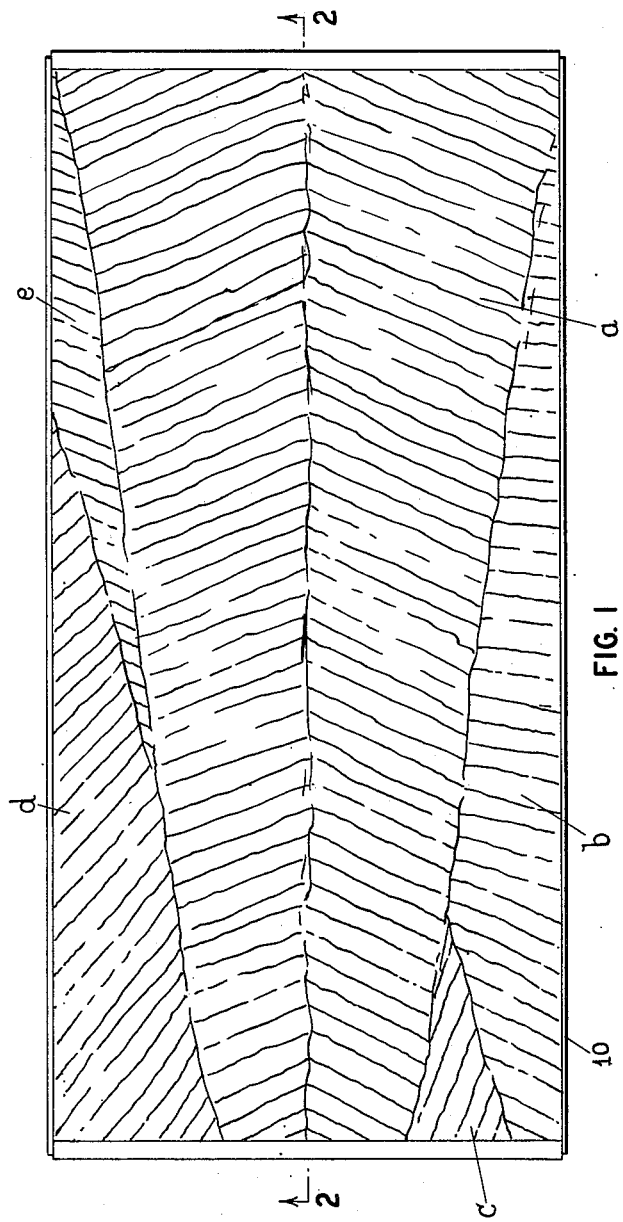
Fig. 1 is a plan view of a finished block or package of fish flesh embodying one phase of the invention, in its container but without the outer wrapping which is applied before marketing.
Figure 2:
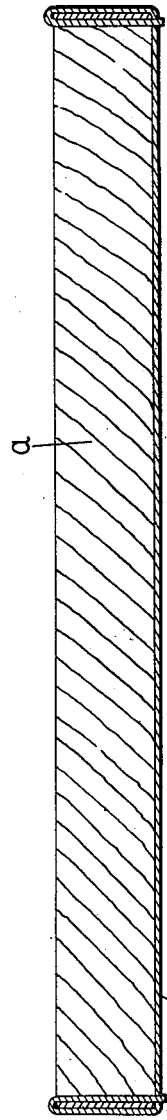
Fig. 2 is a longitudinal sectional view of the block or package taken on line 2—2 of Fig. 1.

In Figs. 1 and 2 is shown a representative frozen block of fish flesh constituting the product phase of our invention. The fish is contained in an open rectangular carton 10 of uniform depth and is composed of pieces of fish fillets which have been skinned and assembled and pressed in such manner that they form a block of uniform thickness, approximately equal to the depth of the carton, and of a length and width substantially equal to the length and width of the carton. The pieces may be placed with either the skinned face or the opposite (inner) face uppermost, since both sides show the striations of the flesh. Many consumers prefer the appearance of the inner side of the fillets, and for such the pieces are packed so that their inner sides face outwardly.

In this illustration the pieces include the major part of a fillet a, centrally located in the block, and other pieces or fragments of fillets designated b, c, d and e arranged so as to fill out the prescribed width and thickness of the block. In other blocks having the essential characteristics of this invention the constituent pieces may be of other dimensions and otherwise arranged, but in all cases the pieces collectively form a compact block of the length, width and thickness prescribed for a commercial unit of any given weight. In all cases also the face of the block which is exposed at the open side of the carton exhibits the striations characteristic of fish flesh. Preferably the pieces are adherently connected together by means additional to the union produced by freezing, so that they remain united after thawing and while being cooked.

When prepared for sale, the packages consisting of a carton and a block of fish flesh are encased in suitable wrappers, which may be opaque and decorated, or translucent. They are closed and sealed so as to prevent dehydration of the contents during frozen storage and exclude foreign matter.

A bond between the pieces of fish, additional to that made by freezing, and continuing after thawing, is obtained by the effect of surface treatment by sodium chloride brine. In such treatment the pieces are immersed in, or flooded with, brine for a brief period, preferably from three to five seconds. We have found that the strength of the brine used for this purpose is highly important, and should be approximately 60% of saturation. A saturated solution of sodium chloride contains approximately 26% by weight of dry salt.

It is desirable also, although not essential, to apply an antioxidant to the fish. This is most conveniently done simultaneously with the brining by mixing the antioxidant with the brine. Any antioxidant that is approved for use on foods may be used. However, we prefer to use ascorbic acid in a concentration of about 1% by weight of the brine.

One procedure of forming the herein described blocks of fish is to place the fillets, after brining, in a moving trough having bounding side walls of a height equal to the prescribed thickness of the final block. Voids between large pieces consisting of whole fillets or major fractions of such fillets are filled by smaller pieces of flesh suitably arranged to occupy such spaces and to fill the trough to such extent that the upper surfaces of the pieces project somewhat above the edges of the confining side walls of the trough. In so arranging the pieces, the operators place them so that the striations are plainly in view and attractively displayed throughout as much of the exposed surface of the mass of fish as possible. Then the fish flesh is subjected to a gradually and progessively applied pressure of an intensity sufficient to equalize the thickness of the mass by displacement of some pieces which overfill the trough (i. e., project higher than the trough walls), to areas where the trough is not fully filled. Due to its gradual and progressive application, a minimum pressure suffices to distribute the pieces with the desired evenness.

In this way a continuous ribbon of fish flesh is formed having a width and thickness equal to the width and depth of the trough. Care is taken in placing the pieces of fish in the trough to limit the height of the loosely placed pieces to the extent which will allow the pressing action to reduce the mass to a substantially uniform thickness, flush with the edges of the trough walls, without unduly compressing the flesh. The average height of the loosely placed pieces is limited to not more than 35% in excess of the height of the trough walls, and the top surface of the flesh is not pressed below the edges of the walls.

The ribbon of fish flesh so made is cut off into pieces of prescribed length, the pieces are placed in cartons of which the interior dimensions are approximately equal to the dimensions of the pieces, and the cartons with their contents are placed in a quick freezing apparatus and the contents are frozen. Any of the presently known quick freezing refrigerators may be used for this freezing step. The packages may be wrapped prior to freezing or afterwards, but preferably they are wrapped first. The packages thus described may be frozen singly or assembled with other packages in a master carton, two or three deep and frozen collectively. Pressure is applied to the top of the package to prevent upward bulging by the expansion due to freezing.

Apparatus for use in the performance of the process described is shown in Figs. 3-6. The trough in which the fish pieces are placed and formed into a ribbon is composed of an endless series of trays 11 secured to a carrier belt 12 which surrounds, and is carried by, a conveyer belt 13 along a horizontal supporting table 14. The conveyer belt passes around rolls 15 and 16, the former of which is positively driven by a motor 17 through a sprocket and chain drive 18. The return stretch of this conveyer passes over guide rolls 18a and 19 and extends under the table 14. The return stretch of the carrier belt 12 with its attached trays rests on a shelf 20 beneath the table. The table and shelf are supported by a framework of any suitable character.

Figure 6:
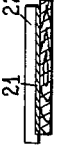
Figure 5:
Fig. 5 is a cross section, and Fig. 6 a longitudinal section of one of the trays which, collectively, provide a trough in which pieces of fish are assembled to provide the ultimate frozen blocks.
Figure 4:
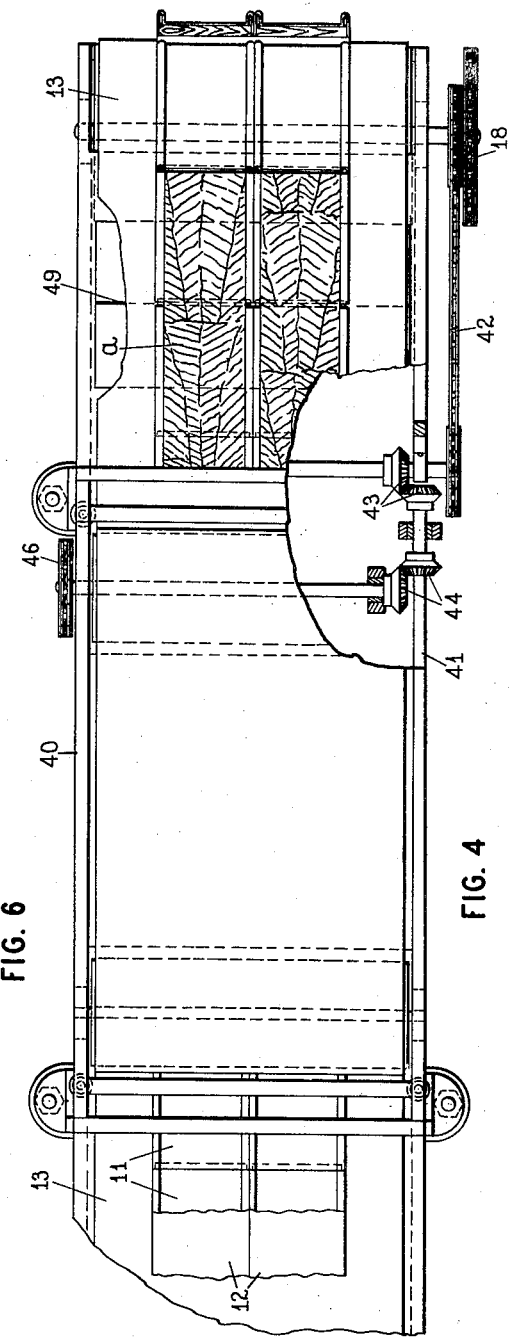
Fig. 4 is a plan view of a portion of the apparatus represented in Fig. 3 and shown on a larger scale.

One of the unit trays is shown in detail in Figs. 5 and 6. It is made of corrosion resistant sheet metal, which may be stainless steel, having a bottom 21 and side walls 22 formed by bending up the margins of the blank at right angles to the part which forms the bottom. The marginal portions are bent double and are of a width sufficient to provide skirts 23 which extend below the bottom. A block of wood 24 is secured to the under side of the bottom between the skirts 23. This wooden block extends at one end beyond the metal tray, and its opposite end registers with the corresponding end of the tray bottom, but the side walls of the tray at that end extend from the block a distance approximately equal to the length of the protruding end of the block as shown by Fig. 6. This formation allows the protruding part of the block to serve as a stop for a knife operated to cut the ribbon of fish flesh, and allows the trays to come into alinement on the table 14 without interference after passing around the roll 16.

All of the trays are alike, having the length, width and depth prescribed for a given frozen block of fish. They are secured at their mid length to the carrier belt 12 so that they can pass around the rolls 15 and 16.

Figure 3:
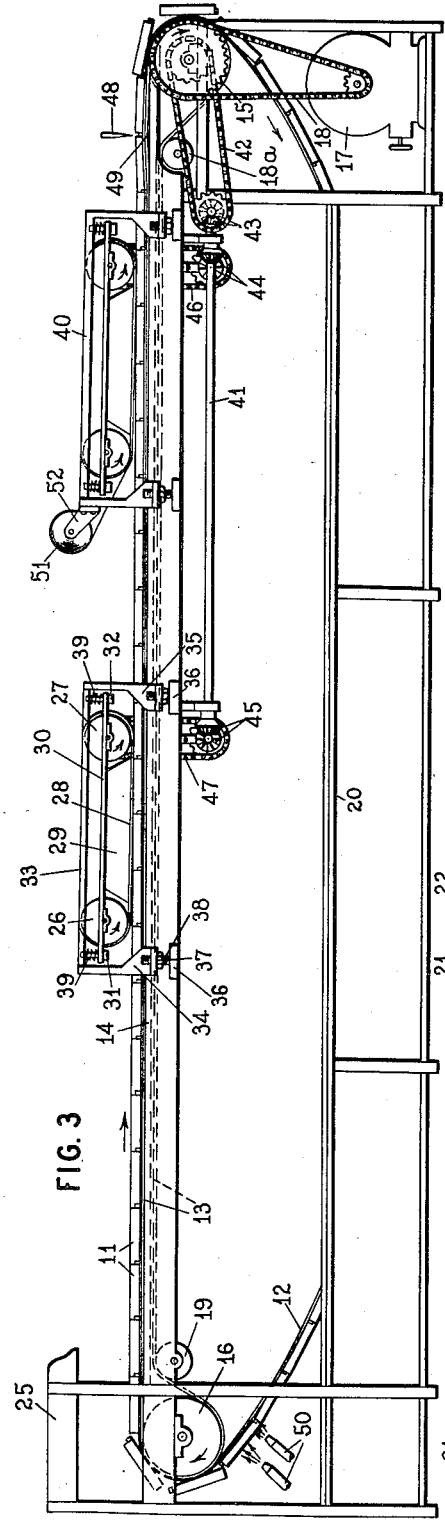
Fig. 3 is a side elevation of apparatus adapted to be used in the performance of the method.

The conveyer belt and trays are propelled in the direction of the arrow in Fig. 3. A shelf 25 is provided above the end of the table where the horizontal travel of the trays begins, on which fillets are delivered from the brining treatment. Operators stationed beside the table take the fillets from the shelf 25 and place them in the moving trough formed by the trays 11.

Beyond the stations where this step is performed, the first of two pressing agencies is located. This comprises two rolls 26 and 27, and an endless belt 28 passing around them. The roll 26, the one nearer to the operator's station, is held at an elevation slightly above the trays so that the parts of the fish flesh which extend above the walls of the tray can pass under it and under the belt 28 without obstruction. But the more remote roll 27 and the portion of the belt 28 which passes under it, rest on the trough walls. A backing block 29 is mounted between the rolls with a straight under face exposed to maintain the under stretch of the belt in an inclined plane tangent to the under sides of the rolls so that it will exert a gradual increasing pressure on the fish.

The rolls 26 and 27 are provided with trunnions which are held in bearings secured to a frame 30, and the block 29 is secured to the same frame. The frame 30 is hung by headed studs 31 and 32 from the top member 33 of an outer frame which has depending pairs of legs 34 and 35 at opposite ends. Both pairs of legs straddle the table 14 and are supported by lugs 36 on the sides of the table or of the supporting frame thereof. Suitable adjusting means, here represented as a nut 37, threaded on a stud 38 rising from the lug 36 serve for adjusting each of the legs 34 and 35 up or down. Springs 39 are mounted on the studs 31 and 32 between the frame 30 and the member 33 so as to augment the pressure due to the weight of the rolls and block.

Beyond this pressing agency the trough is unobstructed for a distance sufficient to provide a station for another operator, who may be called the filling-in operator. This operator is provided with a supply of pieces of fish of various sizes and is employed to place such pieces in void spaces between the fillets previously located in the trough and the side walls of the trough.

Beyond the filling-in operator's station a second pressing agency, designated as a whole as 40, is located, which is like the one first described in all respects and applies pressure to the fill in pieces and a final pressure to the whole mass of fish.

The belts of the pressing agencies are driven so that their lower stretches travel in the same direction and at the same speed as the trough. Driving means for this purpose are here shown as a longitudinal shaft 41 driven from the shaft of the main conveyer roll 15 by sprocket and chain gearing 42, and a bevel gear pair 43. From the shaft 41 bevel gear pairs 44, 45 and sprocket and chain gearings 46 and 47 rotate one of the rolls of each pressing agency.

The belts of the pressing agencies, or at least those surfaces of them which come in contact with the fish flesh, are made of rubber composition and are kept wet to prevent the fish pieces from sticking to them. Also the trays are wetted before fillets are placed in them, and spray nozzles 50 are shown as delivering water to the trays as they approach the conveyer roll 16.

It is sometimes desirable to lay a sheet of transparent or translucent material, such as cellophane, over the fish before placement of the blocks in containers; and to enable this to be done we have provided means for holding a roll 51 of such material in advance of the second pressing agency. Such means may be a bracket 52 secured to the frame of the presser 40 in a location such that the material may pass from the roll between the endless belt of that presser and the traveling trough, so that the material may be drawn off by friction. The sheet material is severed, together with the ribbon of fish, by the knife 48.

In machines equipped with only one trough, the transparent material may be a strip equal in width to the trough and, of course, properly centered. When there are more than one trough, an equal number of separate rolled up strips are provided.

After the moving trough with its contained ribbon of fish flesh passes from the second pressing agency, the ribbon is cut into prescribed lengths by a knife 48 which is passed between the adjacent ends of the side walls of contiguous trays. Such knife may be wielded by an operator, or it may be supported by guiding means and operated by mechanism to sever the fish ribbon when the divisions between successive trays arrive in register with it.

To facilitate entrance of the knife between trays, a hump 49 is formed on the table by upwardly and downwardly sloping surfaces meeting in a low ridge. As the trays pass over the hump a space is opened between the ends of contiguous tray walls.

The severed blocks of fish flesh pass with the trays over the conveyer roll 15, and as the trays approach a steeply inclined position and are separated from preceding trays by the curvature of the roll, an attendant shifts the contained blocks of fish into cartons. By applying a slight pressure with one hand the operator can easily slide the fish block from a tray into a carton held in the other hand.

The table and main conveyer belt are here shown as sufficiently wide to take two troughs side by side, thereby providing capacity for the employment of operators at corresponding stations on both sides of the table. However, like machines may be equipped with only one series of trays, or with more than two.

A convenient size of frozen fish block which we have adopted is one 8 inches long by 4 inches wide by ¾ inch thick. The trays in which the fillets and pieces thereof are assembled have corresponding length and width dimensions and walls of the required height for that thickness. Blocks of other dimensions may of course be made in the same way, but the ¾ inch thickness is the most satisfactory for cooking, and packages having the lateral dimensions mentioned are preferred for home consumption. By virtue of their uniform thickness, the blocks, or sections of less area cut from them, when cooked, are cooked evenly.

A variation of the foregoing method, economically feasible for making multiple packages of frozen blocks larger than those above described, is practised as follows. Frames are provided having a depth equal to a prescribed thickness of the fish block to be made, and other dimensions large enough to contain a prescribed weight of fresh fish flesh. Those which we have designed for producing a three-layer package called a "restaurant pack" are approximately 14" long, 10" wide and ¾" deep, capable of holding four pounds of the flesh. They may be made with bottoms or without. If bottomless, the table on which they rest while being filled provides a bottom.

Before being filled, such a frame is first overlaid and more or less lined with a sheet of cellophane or equivalent tough and translucent material, the dimensions of which are large enough to provide margins which can be folded over and cover the contents of the frame. An operator then places brined fish fillet pieces of various sizes (whole fillets and/or fragments) in the frame flatwise, so that their striations are evident, and spreads them evenly to a height enough greater than the depth of the frame to enable the pieces to be further spread and evened by subsequently applied pressure. Preferably a quantity of fillets having the weight prescribed for the frozen block is first furnished to the operator, and this quantity is packed into the tray.

Then the margins of the sheet are folded over the contained mass of fillets, and evenly distributed pressure is applied to the mass. This causes the pieces to be spread more evenly and the mass to be made smooth on top and bottom. The encased layer of fish so produced is placed in a carton having substantially the same lateral dimensions internally, a separator sheet of stiff fiber board is laid on it, and a like encased layer of fish is laid on the separator. If the ultimate package is to contain three blocks of fish, the procedure is repeated by laying on a second separator and a third encased layer of fish. Then the carton is covered with a smooth-surfaced cover, removed to the freezer, and confined under some pressure while the fish is being frozen.

The stiff separators are placed between layers of soft fish to prevent distortion of the layers during freezing and maintain the smoothness of their broad surfaces. The frozen blocks so made are identical in all essential respects with those resulting from the procedure first described.

The number of layers or blocks in such a multiple package is not a critical factor of this phase of the invention. It is limited only by the thickness of the layers and the limitations of the quick-freezing procedure when the fish is quick-frozen.

Within these limitations they may be two or more than three in number.

We claim:

1. The method of making a block of fish flesh, which comprises assembling pieces of fish fillets in flat condition, overlapping in parts, between confining walls at two opposite sides, without confinement at intermediate sides to a depth slightly greater than the height of such walls, applying pressure to the accumulation of pieces in a manner to displace some of the pieces, and freezing such accumulation.

2. The method of producing a block of fish flesh, which comprises brine treating fish fillet pieces, laying such pieces flatwise with confinement at opposite sides to prevent displacement laterally and without confinement otherwise, in a distribution such as to form a mass of generally uniform thickness, and applying pressure to such mass in a manner to dispose the pieces into an arrangement in which the thickness of the mass is more nearly uniform.

3. The method of producing a frozen block of fish flesh, which comprises brine treating fish fillet pieces, laying such pieces in flat condition between confining walls and in a distribution such as to form a mass of generally uniform thickness, applying pressure to such mass in a manner to dispose the pieces into an arrangement in which the thickness of the mass is more nearly uniform, and then freezing the same.

4. The method of forming blocks of fish flesh, which comprises laying fish fillets and fragments flatwise thereof between lateral confining walls, with arrangement of the pieces into a ribbon of generally uniform average thickness, but thicker in parts than the height of the walls, applying pressure gradually lengthwise upon such ribbon so as to displace some of the pieces lengthwise of the ribbon and bring the ribbon to substantially uniform thickness, and cutting blocks of prescribed lengths from such ribbon.

5. The method of forming blocks of fish flesh, which comprises laying fish fillets and fragments flatwise thereof between lateral confining walls, with arrangement of the pieces into a ribbon of substantially uniform average thickness and indeterminate length, applying pressure gradually lengthwise upon such ribbon so as to bring the same to a more uniform thickness, cutting blocks of prescribed lengths from such ribbon, and freezing the severed blocks.

6. The method of making blocks of fish flesh, which comprises treating fish fillets with brine, placing such fillets lengthwise in a trough having lateral bounding walls, placing pieces of fillets in sufficiently overlapping relation to fill voids between the fillets first placed and the walls of the trough, and to build up a ribbon of fish flesh having a thickness in parts somewhat greater than the depth of the trough, applying pressure to the mass of fish in the trough gradually lengthwise of the trough so as to displace some of the pieces and thereby reduce the mass of flesh to a thickness substantially equal to the height of the trough walls, and cutting blocks from the ribbon of flesh so constituted.

7. The method of making blocks of fish flesh, which comprises treating fish fillets with brine, placing such fillets lengthwise in a trough having lateral bounding walls, placing pieces of fillets in sufficiently overlapping relation to fill voids between the fillets first placed and the walls of the trough, and to build up a ribbon of fish flesh having in parts thickness somewhat greater than the depth of the trough, applying pressure to the mass of fish in the trough gradually lengthwise of the trough so as to displace some of the pieces lengthwise and thereby reduce the mass of flesh to a thickness substantially equal to the height of the trough walls, cutting blocks from the ribbon flesh so constituted, and freezing the severed blocks.

8. The method of making blocks of fish flesh which comprises placing a quantity of fish fillet pieces in a frame over which has been placed a sheet of tough wrapping material, distributing such pieces flatwise so that they occupy subtially the entire area of the frame while being embraced by the sheet material, folding the margins of the sheet material over the mass of fish pieces, applying pressure to the mass in a manner to spread the pieces further and more evenly to a substantially uniform depth in all parts of the mass, and freezing the encased mass.

9. The method of making blocks of fish flesh which comprises placing a quantity of fish fillet pieces in a frame over which has been placed a sheet of tough wrapping material, distributing such pieces flatwise so that they occupy substantially the entire area of the frame while being embraced by the sheet material, folding the margins of the sheet material over the mass of fish pieces, applying pressure to the mass in a manner to spread the pieces further and more evenly to a substantially uniform depth in all parts of the mass, placing a plurality of encased masses of fish so formed in a container with stiff separators between them, placing a smooth-surfaced cover over the topmost of such masses, and freezing the assembled masses.

10. The method of producing a block of fish flesh which comprises surface treating for a brief period fresh fish fillet pieces with sodium chloride brine of approximately 60% saturation, laying such pieces flatwise with confinement at opposite sides to prevent displacement laterally and without confinement otherwise in a distribution such as to form a mass of generally uniform thickness, and applying pressure to such mass in a manner to dispose the pieces into an arrangement in which the thickness of the mass is more uniform and to cause adhesion of the pieces into a block.

11. The method of producing a block of fish flesh which comprises surface treating for a brief period fresh fish fillet pieces with sodium chloride brine of approximately 60% saturation, and containing an anti-oxidant laying such pieces flatwise with confinement at opposite sides to prevent displacement laterally and without confinement otherwise in a distribution such as to form a mass of generally uniform thickness, and applying pressure to such mass in a manner to dispose the pieces into an arrangement in which the thickness of the mass is more uniform and to cause adhesion of the pieces into a block.

HAROLD E. CROWTHER.
LAWRENCE T. HOPKINSON.

References Cited in the file of this patent

UNITED STATES PATENTS

| Number | Name | Date |
|---|---|---|
| Re. 16,740 | Birdseye | Sept. 20, 1927 |
| 978,685 | Andrews | Dec. 13, 1910 |
| 1,773,080 | Birdseye | Aug. 12, 1930 |
| 1,864,285 | Taylor | June 21, 1932 |
| 2,114,530 | Gorton | Apr. 19, 1938 |
| 2,228,644 | Sackas | Jan. 14, 1941 |
| 2,338,939 | Holly | Jan. 11, 1944 |